United States Patent
Mercer et al.

(10) Patent No.: US 6,487,072 B2
(45) Date of Patent: Nov. 26, 2002

(54) STABILIZATION MECHANISM FOR LIMITING ROTATIONAL VIBRATION IN A MODULE ENCLOSURE

(75) Inventors: Alicia G Mercer, Davis, CA (US); Kenneth K Tang, Sacramento, CA (US); Herbert J Tanzer, Folsom, CA (US); Brian S. Tsuyuki, Roseville, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 26 days.

(21) Appl. No.: 09/798,478

(22) Filed: Mar. 2, 2001

(65) Prior Publication Data

US 2002/0122294 A1 Sep. 5, 2002

(51) Int. Cl.[7] .................................................. G06F 1/16
(52) U.S. Cl. ........................ 361/685; 361/686; 361/724; 312/223.1; 312/332.1; 248/220.31
(58) Field of Search ................................ 361/683, 685, 361/724–727, 747, 730–732, 729, 735; 312/223.1, 223.2, 216, 218, 251.1, 333, 330.1, 332.1, 334.13; 369/77.2, 75.1, 77.1; 748/220.31, 224.8, 60, 581, 638, 609, 611, 632, 500, 346.06, 229.16, 220.22, 222.12; 360/137, 137 D, 900, 97.01, 98.01, 96.02; 292/31, 106, 101; 20/453, 525; 307/53; 364/706.1

(56) References Cited

U.S. PATENT DOCUMENTS 3,263,953 A * 8/1966 Shottenfeld et al. ........ 248/358
4,553,183 A * 11/1985 Brown et al. ................. 360/98
4,642,715 A * 2/1987 Ende ........................... 360/97
4,688,131 A * 8/1987 Noda et al. ................. 360/137
4,831,476 A * 5/1989 Pisczak .................... 360/97.02
5,123,721 A * 6/1992 Seo ............................ 312/333
5,564,804 A * 10/1996 Gonzales et al. ........ 312/223.1
5,801,920 A * 9/1998 Lee .......................... 363/708.1
6,052,278 A   4/2000 Tanzer et al.
6,088,222 A * 7/2000 Schmitt et al. ............. 361/686
6,154,361 A   11/2000 Anderson et al.
6,160,703 A * 12/2000 Lopez ........................ 361/685
6,166,901 A * 12/2000 Gamble et al. ............. 361/685
6,176,690 B1 * 1/2001 Knepp ........................ 417/359
6,238,026 B1 * 5/2001 Adams et al. ........... 312/223.1
6,247,944 B1 * 6/2001 Bolognia et al. ........... 439/157
6,359,836 B1 * 3/2002 Sevier et al. ............... 367/725
6,370,022 B1 * 4/2002 Hooper et al. .............. 361/685
6,373,695 B1 * 4/2002 Cheng ........................ 361/685
6,388,875 B1 * 5/2002 Chen ......................... 361/685

FOREIGN PATENT DOCUMENTS

JP         363175285 A * 7/1988 .......... G11B/33/08
JP         06236669 A  * 8/1994 .......... G11B/33/02

* cited by examiner

Primary Examiner—Darren Schuberg
Assistant Examiner—Michael Datskovsky

(57) ABSTRACT

A stabilization mechanism limits rotational vibration in a module enclosure containing plural objects, such as computer disk drives, that produce rotational vibration about a rotational axis. The mechanism includes stabilizer structure coupled to an outer surface of the module enclosure and constructed to transmit a force toward the object that is effective to stabilize the object in the module enclosure. The stabilization mechanism may be formed as first and second spring-loaded contacts that each apply a constant force to the object.

8 Claims, 2 Drawing Sheets

STABILIZATION MECHANISM FOR LIMITING ROTATIONAL VIBRATION IN A MODULE ENCLOSURE

FIELD OF THE INVENTION

The present invention relates generally to enclosures for plural modular objects, such as computer disk drives or other data storage modules, that produce rotational vibration. More particularly, the present invention concerns a stabilization or dampening mechanism that can be coupled to an enclosure for data storage modules to limit undesired effects of rotational vibration caused by high speed computer disk drives.

BACKGROUND OF THE INVENTION

Data storage equipment components typically comprise plural data storage modules that slidably dock within a module enclosure. Examples of such enclosures are shown in the following two patents, U.S. Pat. No. 6,154,361 to Anderson et al. and U.S. Pat. No. 6,052,278 to Tanzer et al., each of which is incorporated herein by reference. Each of those patents disclose examples of a representative removable module enclosure system, also referred to as a disk-drive chassis or disk-drive enclosure.

A typical data storage module will include many (e.g. 15) disk drives, and each drive includes an internal drive mechanism and a drive platter that spins at high speeds during operation. Typical applications for data storage modules include data centers that have one or more servers and plural removable module enclosures. As shown in the incorporated references, there are many known data storage module enclosures, but none deal effectively with the problem of the undesired effects of rotational vibration caused by high speed computer disk drives.

Conventional drive platters spin at speeds of greater than 7200 rpm creating gyroscopic forces that result in rotational vibration. That rotational vibration causes undesired effects on the operation of the disk drives themselves. Those undesired effects include slight vibrations in the read/write arm of the disk drive in the same plane as the drive platters, which in turn cause undesired read/write errors in the data collection, thereby reducing performance. Conventional proposals have been somewhat effective to reduce external vibrations but have not been as effective in limiting or dampening the above-described rotational vibrations that are created internally within the platters.

SUMMARY OF THE INVENTION

The invention may be thought of as a stabilization mechanism that limits rotational vibration in a module enclosure containing plural objects, such as computer disk drives, that produce rotational vibration about a rotational axis. Alternatively, the invention may be thought of as a dampening mechanism. In either case, the invention includes a stabilizer (or dampening) structure coupled to an outer surface of the module enclosure and constructed to transmit a force toward the module enclosure that is effective to stabilize the module enclosure and the disk drive. The stabilization mechanism may be formed as plural, such as first and second, spring-loaded contacts that apply a constant force to the module enclosure and disk drive. The first spring-loaded contact is positioned adjacent that section of the disk drive containing the drive mechanism and the second spring-loaded contact is positioned adjacent that section of the disk drive containing the drive platter. The second spring-loaded contact transmits a force that is greater than the force transmitted by the first spring-loaded contact. The force transmitted by the second spring-loaded contact is in the range of about 12–17 pounds, and the force transmitted by the first spring-loaded contact is in the range of about 3–7 pounds.

BRIEF DESCRIPTION OF THE FIGURES

FIG. 3 is an enlarged, fragmentary view showing part of the preferred embodiment of the invention.

DETAILED DESCRIPTION OF THE INVENTION

Figure 1:
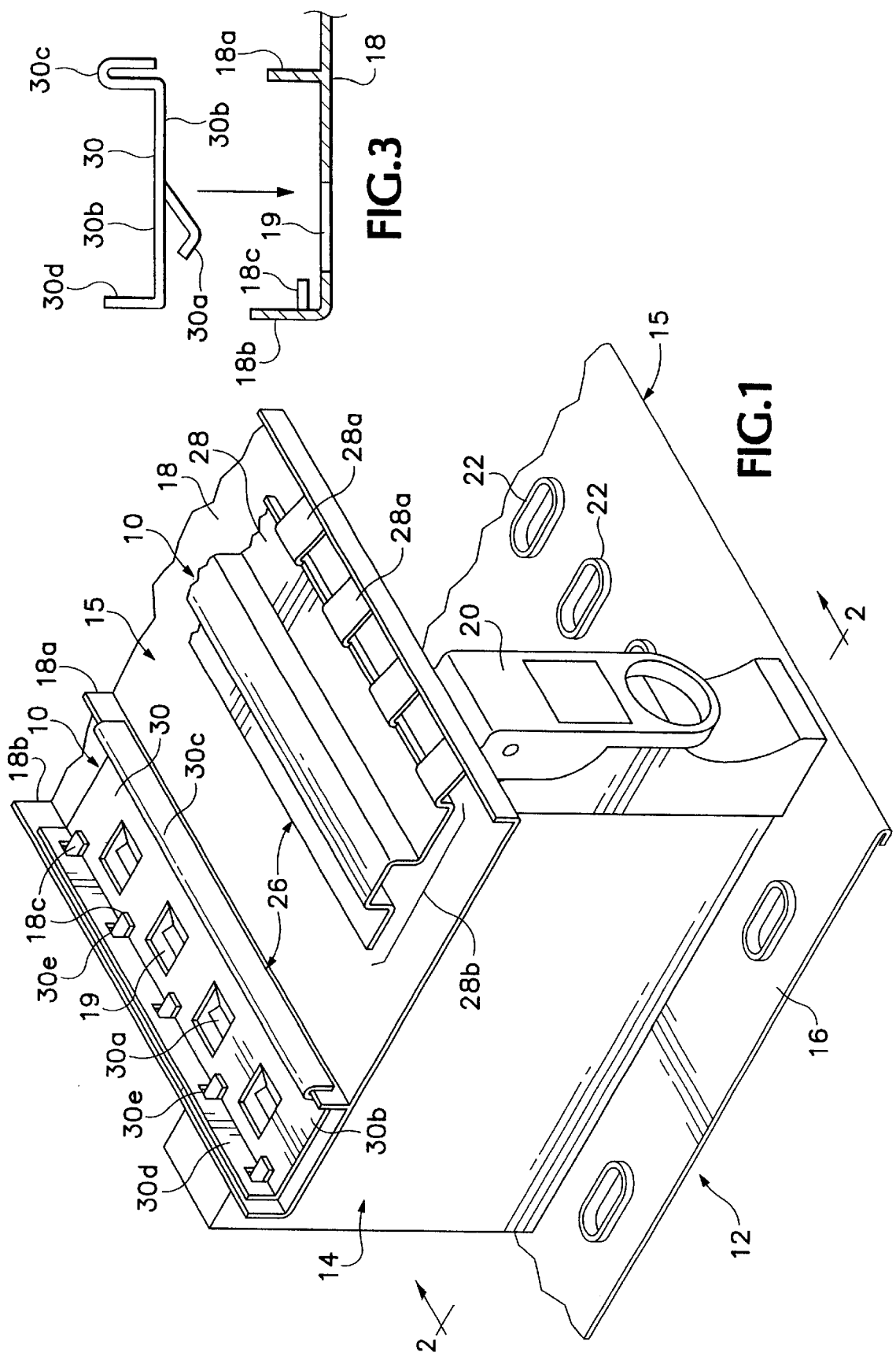
FIG. 1 is a fragmentary isometric view of the preferred embodiment of the invention having been incorporated into a module computer-disk-storage enclosure.

From an overview, there is discussed below one embodiment of the present invention as it relates to a certain to-be-described removable module enclosure with a to-be-described outer surface including a top rail. However, it should be understood that the invention maybe incorporated in various module enclosures and the description below is meant to provide one example of how the invention may be used. In addition to the representative removable module enclosures shown in the Referring to FIGS. 1 and 2, the presently described embodiment of the invention is shown at 10 as a dampening mechanism or stabilization mechanism for a removable module computer-disk-storage enclosure 12 for storing plural removable computer-disk modules (or drives), one of which is shown at 14. Only those features of enclosure 12 that are pertinent to mechanism 10 are shown and it is understood that mechanism 10 could be incorporated in any module enclosure system.

As shown, module enclosure 12 includes an outer surface 15 formed from a bottom support plate 16 and a top rail 18. Top rail 18 includes ridges 18a, 18b, and tabs 18c. The top rail is also formed with openings 19 for reasons to be described. While undepicted, sides and other structural sections are included as shown in Anderson et al. and Tanzer et al. Also for reasons to be described, computer-disk-storage module 12 includes a latch or lever member 20, and bottom support plate 16 includes plural guide members 22 defining tracks or borders for removably receiving plural modules like module 14. Latch 20 is suitably pivotably attached to the module as shown generally in FIG. 2 and in representative further detail in Tanzer et al.

Figure 2:
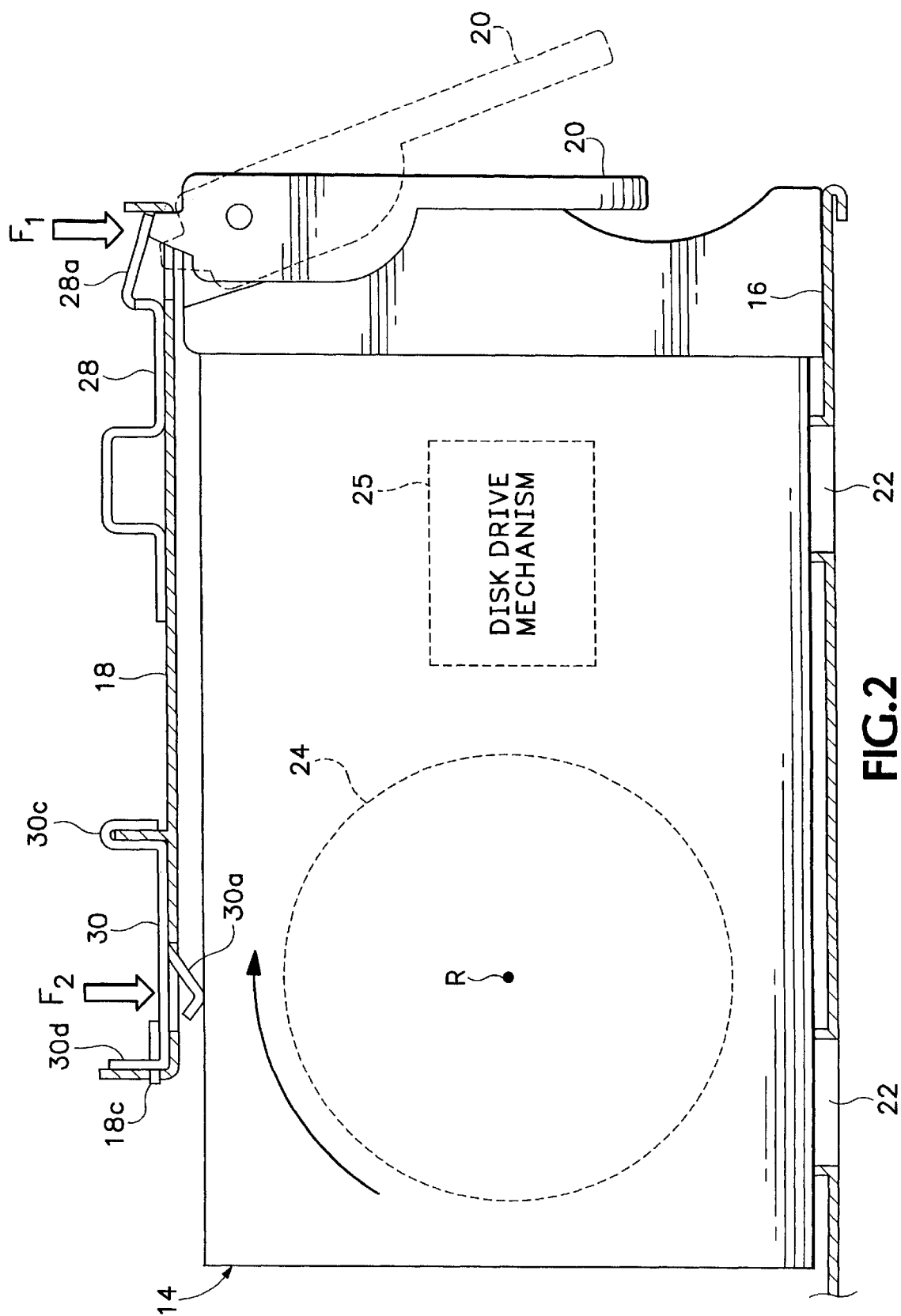
FIG. 2 is a section view of FIG. 1 through lines 2—2.

Still referring to FIGS. 1 and 2, dampening mechanism 10 is effective to lessen rotational vibration in module enclosure 12 for plural computer disk drives due to relatively high speed rotation of computer drive platters, such as the platter shown schematically and by dashed lines at 24 in FIG. 2. The platter rotates in the direction shown by the arrow about a rotational axis R. As is known to those skilled in the art, computer disk drives such as drive 14 also have an internal section containing a drive mechanism (shown schematically at 25 in FIG. 2).

Turning now to the details of mechanism 10, it includes stabilizer structure (also referred to as dampening structure) 26 coupled to outer surface 15 and constructed to transmit a constant force toward module 14 as shown in FIG. 2. That force is effective to stabilize module 14 and the computer disk drive when the disk drive produces rotational vibration during operation as discussed above. For the enclosure shown in the drawings, the stabilizer structure is formed as plural spring-loaded members (also referred to as contacts), such as first spring-loaded member 28 and second spring-loaded member 30, and each apply a constant force to the module.

Referring to FIGS. 1–3, first spring-loaded contact 28 is positioned adjacent that section of module 14 containing drive mechanism 25 and second spring-loaded contact 30 is positioned adjacent that section of the disk drive containing drive platter 24. In the depicted embodiment, it will be appreciated that second spring-loaded contact 30 is over and approximately aligned with rotational axis R of platter 24. First spring-loaded contact 28 is over a forward region of module 14.

For reasons to be described, second spring-loaded contact 30 transmits a force $F_2$ that is greater than a force $F_1$ transmitted by first spring-loaded contact 28. Typically, the force transmitted by second spring-loaded contact 30 is in the range of about 12–17 pounds, and the force transmitted by first spring-loaded contact 28 is in the range of about 3–7 pounds.

For the application depicted in the drawings, contact 28 is formed of 1.2 mm thick sheet metal, and includes plural spring plates 28a (each formed to extend at a preselected nominal downward angle of approximately 29° (FIG. 3) from the plane of top rail 18 and deflect upwardly up to approximately 13.5° from its nominal downward angle (FIG. 2)) and support/attachment region 28b. Spring plates 28a, it will be appreciated, selectively engage module 14 via latch 20, typically bilaterally, adjacent opposite sides edges of the module to enhance stability. Region 28b is suitably coupled to top rail 18 using a process know as flaring which is similar to spot welding. As shown in FIGS. 1–2, region 28b is formed with an inverted channel to add a desired level of rigidity to the module enclosure.

Still referring to FIGS. 1–3, contact 30 is formed of 0.5 mm thick sheet metal, and includes plural spring plates 30a, support/attachment region 30b, clip region 30c and back support region 30d. Referring to FIG. 3, contact 30 is removably attachable to top rail 18 by moving it downwardly in the direction of the arrow toward the top rail so that clip region 30c can make a clip interference fit with ridge 18a. When it is moved downwardly toward top rail 18, contact 30 is moved at an angle (undepicted in FIG. 3) with back support region 30d first being moved into place against ridge 18b so that tabs 18c extend through corresponding openings 30e formed in back support region 30d (shown best in FIG. 2). Then contact 30 is moved in mating contact with top rail 18 (see for example FIG. 1) so that clip region 30c is clipped onto ridge 18a and so that spring plates 30a also form an interference fit with top rail 18, extending downwardly at a preselected angle of approximately 29° into openings 19 formed in top rail 18. Spring plates 30a thus engage module 14 in a rearward region thereof, typically centrally across the module. As an alternate (undepicted) way of securing contact 30 in position, tabs 18c may be formed as part of back support region 30d so that they can be moved into openings as part of the above-described removable attachment of contact 30 to top rail 18.

Spring plates 28a and 30a thus provide a tripod-like spring engagement of the upper surface of the module. This results in a stabilization mechanism which effectively limits rotational vibration of plural removable modules. It will also be appreciated that the stabilization mechanism of the invention is flexible in that many different configurations of spring plates are possible to meet the needs of a particular application. The tripod-like spring engagement shown in the figures is but one example of those possible configurations of spring plates.

From the above description, it should be understood that stabilizer or dampening structure 10 could be formed in a variety of configurations, including as contacts that provide single or plural spring plates, with contacts 28, 30 providing an example of a version that provides plural spring plates. The stabilizer or dampening structure may also be constructed to provide any desired force. For example contacts 28, 30 may transmit preselected forces based upon variations in material choice and deflection angle of the spring plate relative to the top rail of the enclosure. Due to its feature of being removably attachable to top rail 18, contact 30 may also be replaced with a contact being capable of transmitting a different, desired range of forces. The forces transmitted by contacts 28 and 30 may also be the same or may vary as desired. It has been found for the application depicted in the figures that constructing rear contact 30 to transmit a greater force than front contact 28 is particularly advantageous in limiting rotational vibration caused by the drive platter located in the rear of the module enclosure.

INDUSTRIAL APPLICABILITY

The invented stabilization or dampening mechanism has broad applicability in connection with module enclosures for rotational-vibration-producing objects such as computer disk drives. Module enclosures equipped with the stabilization or dampening mechanism of the invention will be effective to limit undesired effects of rotational vibration caused by high speed drive platters, and as a result, those module enclosures will limit corresponding damage to drive platters as well as the known deficiencies in drive operation due to rotational vibration. The invented mechanism is inexpensively manufactured using existing tools, dies and assembly processes and equipment.

Accordingly, while the present invention has been shown and described with reference to the foregoing preferred embodiments, it will be apparent to those skilled in the art that other changes in form and detail may be made therein without departing from the spirit and scope of the invention as defined in the appended claims.

We claim:

1. A stabilization mechanism for limiting rotational vibration in a module enclosure that contains an object that produces rotational vibration about a rotational axis, the module enclosure including an outer surface, the stabilization mechanism comprising:

stabilizer structure coupled to the outer surface and constructed to transmit a force toward the object that is effective to stabilize the object in the module enclosure when the object produces rotational vibration;

wherein the object is a computer disk drive having an internal section containing a drive mechanism and another internal section containing a drive platter that is rotatable at relatively high speeds; and wherein the stabilizer structure includes a first spring-loaded contact positioned adjacent that internal section of the disk drive containing the drive mechanism and a second spring-loaded contact removably positioned adjacent that internal section of the disk drive containing the drive platter, the first and second spring-loaded contacts applying a substantially constant force to the computer disk drive.

2. The stabilization mechanism of claim 1 wherein the second spring-loaded contact transmits a force that is greater than the force transmitted by the first spring-loaded contact.

3. The stabilization mechanism of claim 1 wherein the force transmitted by the second spring-loaded contact is in the range of approximately 12 pounds to 17 pounds, and the force transmitted by the first spring-loaded contact is in the range of approximately 3 pounds to 7 pounds.

4. The stabilization mechanism of claim 1 wherein the first spring-loaded contact includes a pair of spring plates positioned to engage the object bilaterally.

5. The stabilization mechanism of claim 1 wherein the second spring-loaded contact includes a plate positioned to engage the object centrally.

6. In a module enclosure for plural computer disk drives, a dampening mechanism for lessening rotational vibration due to relatively high speed rotation of computer drive platters associated with plural disk drives, the module enclosure including an outer surface, the dampening mechanism comprising:

dampening structure coupled to the outer surface and constructed to transmit a force toward the plural disk drives that is effective to stabilize the plural disk drives in the module enclosure when the drive platters associated with the disk drives produce rotational vibration during operation; and wherein the dampening structure is formed as a first spring-loaded contact positioned over a section of the plural disk drives containing drive mechanisms and a second spring-loaded contact removeably positioned over a section of the plural disk drives containing the drive platters.

7. The dampening mechanism of claim 6 wherein the second spring-loaded contact exerts a force on each disk drive that is greater than a force exerted by the first spring-loaded contact on each disk drive.

8. The dampening mechanism of claim 7 wherein the force exerted by the second spring-loaded contact on each disk drive is in the range of approximately 12 pounds to 17 pounds, and the force exerted by the first spring-loaded contact on each disk drive is in the range of approximately 3 pounds to 7 pounds.

\* \* \* \* \*